United States Patent [19]

Koliopoulos et al.

[11] Patent Number: 5,471,307
[45] Date of Patent: Nov. 28, 1995

[54] SHEET FLATNESS MEASUREMENT SYSTEM AND METHOD

[75] Inventors: Chris L. Koliopoulos; Shouhong Tang, both of Tucson, Ariz.

[73] Assignee: Phase Shift Technology, Inc., Tucson, Ariz.

[21] Appl. No.: 947,389

[22] Filed: Sep. 21, 1992

[51] Int. Cl.$^6$ .................................. C01B 11/30
[52] U.S. Cl. ........................... 356/371; 356/376
[58] Field of Search .................... 356/371, 376, 356/237; 250/237 G

[56] References Cited

U.S. PATENT DOCUMENTS

| | | |
|---|---|---|
| 2,867,149 | 1/1959 | Goddard . |
| 3,314,328 | 4/1967 | Boettcher . |
| 3,858,981 | 1/1975 | Jaerisch . |
| 4,079,252 | 3/1978 | Brake . |
| 4,102,578 | 7/1978 | Suzuki . |
| 4,390,277 | 6/1983 | Quinn . |
| 4,641,972 | 2/1987 | Halioua et al. ............ 356/376 |
| 4,918,321 | 4/1990 | Klenk . |
| 4,929,846 | 5/1990 | Mansour . |
| 4,972,093 | 11/1990 | Cochran . |

FOREIGN PATENT DOCUMENTS

| | | | |
|---|---|---|---|
| 23205 | 2/1984 | Japan | 356/371 |
| 200141 | 10/1985 | Japan | 356/376 |
| 285208 | 11/1990 | Japan | 356/371 |
| 696281 | 11/1979 | U.S.S.R. | 356/376 |

OTHER PUBLICATIONS

Hammond et al. "Detecting Surface Deformities" *IBM Technical Disclosure Bulletin*, vol. 14, No. 1 (Jun. 1971) pp. 49–50.

Primary Examiner—Richard A. Rosenberger
Attorney, Agent, or Firm—LaValle D. Ptak

[57] ABSTRACT

A sheet flatness measuring system consists of a frame carrying a structured illumination system for producing illumination beneath the frame in a periodic pattern of opaque and illuminated lines. A flat base or table, having a surface parallel to the structured illumination system, is placed beneath the structured illumination system to be illuminated by it. A sheet of reflective or semi-reflective material, the flatness of which is to be measured, is placed on the table. The reflection of the structured illumination is viewed from the sheet a by video camera, typically mounted in a central location above the center of the table on which the sheet is placed. The structured illumination pattern is moved to different positions, and multiple video images are digitized and compared in a computer to calculate the local slope at each point or pixel in the image of the sheet viewed by the camera. From this slope information, the computer derives an output representative of variations in the surface flatness of the sheet undergoing measurement.

19 Claims, 5 Drawing Sheets

FIG_10A

FIG_10B

FIG_10C

FIG_10D

SHEET FLATNESS MEASUREMENT SYSTEM AND METHOD

BACKGROUND

Various systems have been developed for measuring the surface flatness of a work piece. Applications for such systems cover a wide range of products on which a flat surface is desired. One system which is employed in the steel sheet industry uses mechanical scanning. In this system a single transducer or a small number of transducers, such as a laser distance sensor or a capacitance sensor is moved over the sheet surface to provide an output indicative of variations in the flatness of the sheet. Systems of this type require considerable skill to operate in order to meet the necessary standards of accuracy required.

Other systems measure surface shape by the use of optical flats. Optical flat techniques are suitable, however, only when the surface being checked for flatness has relatively highly polished or light-reflective characteristic sufficient to produce the desired optical pattern. Optical flats systems are highly sensitive, are typically useful only for relatively small area surfaces, and are very susceptible to error, particularly when the system is operated by persons having relatively little familiarity with the system.

For machine shop operations, systems have been developed for measuring the flatness of a relatively small area work piece at different stages during the machining operation. A patent directed to such a system is Boettcher U.S. Pat. No. 3,314,328. The small area flat surface to be measured is placed on a transparent sheet, which has grating lines formed on its surface. A collimated light source then is directed to the specimen under inspection through the transparent support surface. The light is transmitted through the support surface at an angle, and is reflected onto a mirror, which in turn reflects the light to an observation window. The grating pattern is observed in the window; and if there are imperfections in the flatness of the surface under test, those imperfections show up as curved lines in the observed pattern. Because collimated light is required, and, further, because of the relatively complex transmission path, the system is of no use with large area surfaces such as rolled steel or aluminum sheets.

Two other systems, which are somewhat similar to the system of Boettcher, and which use collimated light for flatness measurements, are disclosed in the patents to Goddard U.S. Pat. No. 2,867,149 and Jaerisch U.S. Pat. No. 3,858,981. The system disclosed in the Goddard patent is substantially the same as the one described above for the Boettcher patent. The device in Jaerisch is based upon a reflective object, and is substantially a two-beam interferometer with an advantage over standard interferometers in that the grating produces an incident light beam at an angle of incidence to reduce the sensitivity. The systems of all three of these patents measure surface height or surface variations from absolute flatness.

In each of the devices disclosed in Goddard, Boettcher and Jaerisch patents, the illumination system requires collimated light. To achieve parallel illumination (namely collimated light), the light source must be small in extent, producing a fan of rays diverging from the given point, with a lens used to "collimate" the light. This causes the light rays to be parallel when the source is placed at the rear focal point of the lens, in effect placing the source at infinity. The size of the collimated light bundle is therefore defined by the diameter or physical size of the collimating lens. Obviously, collimated systems of this type are limited for use with relatively small area surfaces defined by the diameter of the collimating lens.

In each of the systems disclosed in the Boettcher, Goddard and Jaerisch patents, the grating is in close proximity to the object under test. The grating consists of alternating clear and opaque straight lines. Collimated (parallel) light rays falling on the grating cast a shadow of the lines on the surface of the object under test. The requirement of the systems of these patents is that the shadow of the grating must be well defined on the object under test. If the grating lines are narrowly spaced, the distance between the grating and the object under test must be small, due to diffraction of the grating lines blurring the shadow. For grating lines spaced farther apart, the object under test can be slightly farther away from the grating. Typically, the spacing between the grating and the object under test must be less than the square of the grating line spacing. Consequently, for a 100 line per millimeter grating, the object under test cannot be farther away than approximately 100 microns. In the systems of the Boettcher, Goddard and Jaerisch patents, the grating and collimated bundle of light are approximately the same size as the test object or surface undergoing measurement. This is a consequence of the fact that the systems directly measure the surface height.

A different approach to determining variations in surface height or, therefore, departures from surface flatness is disclosed in the Suzuki U.S. Pat. No. 4,102,578. This patent does not employ shadows or grating, but instead images a single line on the surface under test. This line is imaged through a grating and onto a moving film to create a full image. Instead of building up an image point-by-point, the system of Suzuki generates an image one line at a time. The device of Suzuki measures surface height directly; and the sensitivity to height is determined primarily by the angle between the projector and the imaging arm.

Another approach is described in the system of the patent to Quinn U.S. Pat. No. 4,390,277. The instrument of the Quinn patent uses information of local surface slope variation to determine, over a small region at a time, the RMS variation of a surface over this small region. Collimated light is required; and the slope information is not used to determine the height variation of the surface. Instead, it is used to determine the scattering properties. The instrument must scan the surface to measure the complete surface. This is a point-by-point scanning system, again, useful only for relatively small area surfaces.

At the present time rolled aluminum and steel sheet and plate products are produced in widths that vary typically between 36" to 83". These products are used for lithography, beverage cans, foils and closures, as well as for panels in household appliances and automobiles. Plate products are typically sold in the specified lengths without coiling. The flatness of rolled sheet and plate products is an important attribute from a customer satisfaction standpoint, as well as from the production standpoint. As a result, flatness is monitored at various stages during fabrication. In the cold mills and the finishing mills sections of rolled sheet are cut to lengths of 60" to 120" and placed on an inspection table. The flatness of the sample is then measured either manually or through the use of single point measurement devices that scan over the entire area. The manual measurement of flatness is difficult and inaccurate, while the scanning devices are time consuming and not well suited for the production environment.

It is desirable to provide a sheet flatness measuring system and method, which does not require collimated light, which does not require a grating in close proximity to the object under test, which does not need to scan point-by-point or line-by-line to acquire information in a piece-wise fashion, and which further is capable of measuring the flatness of large sheets having reflective and semi-reflective surfaces.

SUMMARY OF THE INVENTION

Accordingly, it is an object of this invention to provide an improved sheet flatness measurement system.

It is another object of this invention to provide an improved method for measuring the flatness of relatively large sheets.

It is an additional object of this invention to provide a sheet flatness system and method for measuring the flatness of large sheets where a collimating lens would be impractical.

It is yet another object of this invention to provide an improved sheet flatness measurement system that provides both qualitative and quantitative assessment for sheet flatness.

It is a further object of this invention to provide an improved method for measuring the flatness of relatively large sheets in a rapid manner.

It is a still further object of this invention to provide a sheet flatness measuring system for measuring surface slope and heights through the use of a structured illumination system imaged through the sheet sample resulting in a pattern of dark and bright bands, referred to as contour lines, over the entire surface that is representative of the flatness of sheet sample and the use of algorithms, in the case that quantitative data is required, for the analysis of the contour lines to produce an output indicative of the shape of the sheet under measurement.

In accordance with a preferred embodiment of the invention, a system for measuring the flatness of large reflective and semi-reflective surfaces includes a flat base member, on which a sheet, the flatness of the surface of which is to be measured, is placed. A frame is located over the base member on which the sheet is placed. The frame carries a structured illumination system, which produces a pattern of dark and bright bands on the surface of the sheet on the base member. This pattern is detected by an imaging element, which may be a video camera, and is stored electronically. The structured illumination system is moved relative to the base member, and the images of the resulting variations in the pattern on the surface undergoing measurement are acquired. The images are manipulated by a computer which produces an output directly indicative of the departures from flatness of the sheet undergoing measurement.

In accordance with another embodiment of the invention, a method for measuring the flatness of reflective and semi-reflective surfaces includes the steps of first providing a structured illumination in the form of a periodic pattern of opaque and illuminated lines. The structured illumination then is oriented parallel to the surface under test, and then is moved to cause the light level on the surface undergoing measurement to vary in accordance with the periodicity of the structured illumination. The light level, which is reflected from the surface, is detected at different phase-related positions. This information is used to determine changes in the shape of the detected structured illumination pattern caused by departures from flatness in the surface being measured for subsequent analysis to determine the profile of the surface of the sheet undergoing measurement.

DETAILED DESCRIPTION

Reference now should be made to the drawings, in which the same or similar reference numbers are used throughout the different figures to designate the same components.

Figure 1:
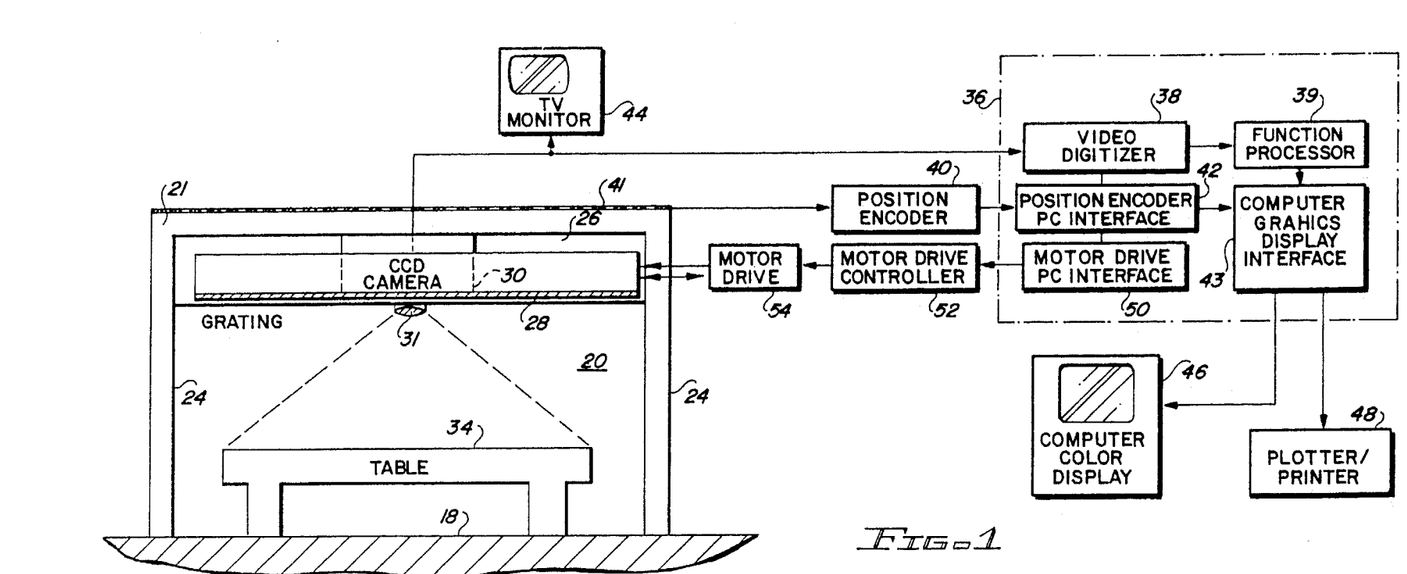
FIG. 1 is a diagrammatic illustration and block diagram of preferred embodiment of the invention.

A sheet flatness measuring system or sheet flatness tester constructed in accordance with a preferred embodiment of the invention is illustrated in FIG. 1. Before entering into a discussion of the specific structure and operation of the embodiment of FIG. 1, some general observations first will be made. The sheet flatness tester essentially is an optical device for determining the flatness of rolled metal sheet products. The metal sheet sample either is cut from a coil and placed on a flatness table, or tension can be relieved from the coil in an on-line process, with the material resting on a flatness table without cutting a sample from the coil. The sheet undergoing measurement is maintained at rest for approximately five seconds during the data acquisition time of the system. The system obtains images at multiple image points on the sheet undergoing measurement. A high spatial resolution of the image represents over 50,000 points where the flatness is obtained for a typical sheet having a width from 36" to 82" and a length from 72" to 120". The resultant data obtained from the system then is displayed in a variety of ways to indicate the sheet flatness characteristics or measurements to an operator.

The sheet flatness measuring system or sheet flatness tester of the preferred embodiment, primarily is used for accurately measuring the flatness of aluminum sheets used for lithography and can stock. The system, however, also may be used for measuring any bright sheet material having either a semi-reflective surface or a mirrored finish.

As illustrated in FIG. 1, the sheet flatness tester 20 is placed on a floor 18. A rigid steel framework, comprising an upper rectangular frame 21 supported by vertical legs 24, is placed over a flatness table 34. The framework 21/24 typically is made of relatively heavy duty steel beams and plates, appropriately cross-braced, so that it is stable under all conditions of operation of the system. The flatness table 34 is manufactured to high tolerances to have a perfectly flat upper surface, with a finish selected to match the finish of the sheets subsequently placed on the table for measurement and test.

The surface of the table 34 is oriented parallel to a grating 28 located on the lower side of an illumination unit 26. The grating 28, or the illumination unit 26 and grating 28 together is movably mounted on the upper portion of the frame 21 for limited movement in the longitudinal direction of the table 34, as indicated by the arrows in FIGS. 1 and 3. In general, the direction of motion of the illumination unit 26 depends on the grating used. The manner in which the illumination unit 26 and/or grating 28 is mounted for such limited longitudinal motion is not shown. This can be accomplished in any suitable manner capable of maintaining the grating 28 parallel with the table 34 throughout the extent of motion. The wheels, bearings and motors for accomplishing the desired movement may be of any configuration capable of effecting the controlled movement required by the system.

The grating 28 is made to produce a structured illumination in the form of a periodic pattern of opaque and illuminated lines transmitted through the grating from light sources located within the illumination unit 26. The construction of the illumination unit, along with various grating patterns, are discussed subsequently.

Figure 2:
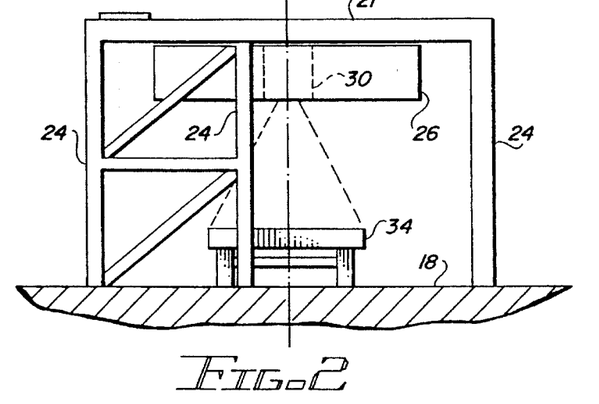
FIG. 2 is an end view of the structure used in the embodiment of FIG. 1.
Figure 3:
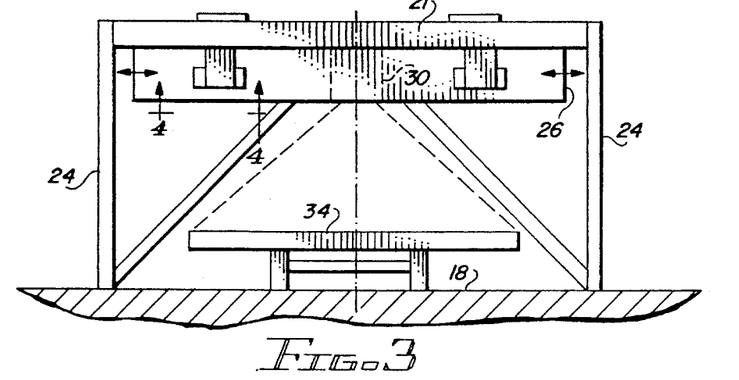
FIG. 3 is a side view of the structure shown in FIG. 2.

A stationary CCD video camera 31, having a wide field of view imaging lens, is mounted on the frame 21 in a central position above the table 34, as is most clearly seen from an examination of FIGS. 2 and 3. This camera provides a video input simultaneously of the entire surface of the table 34 to a video digitizer 38 located within a processing computer 36. The video digitizer 38 produces a digital representation of the light intensity at each of the different image points (pixels) on the surface of the sheet placed on the flatness table 34. The digitized information is supplied to a function processor 39, which supplies signals to a computer graphics display interface to provide outputs to a computer color display 46, and to a plotter/printer 48. The output of the camera also is supplied directly to a conventional television monitor 44 to produce a direct video image representative of the appearance of the grating pattern on the surface of the sheet placed on the table 34.

The operation of the video digitizer 38 is controlled by, and coordinated with, a position encoder and computer interface 42, the output of which also is supplied to the computer graphics display interface 43 to control the computer color display 46 and the plotter/printer 48. The position encoder interface 42 further is interconnected with a motor drive interface 50, which supplies signals to a motor drive control 52, the output of which, in turn, controls the motor drive 54 for positioning the illumination unit 26 or grating 28, as described above.

Figure 4:
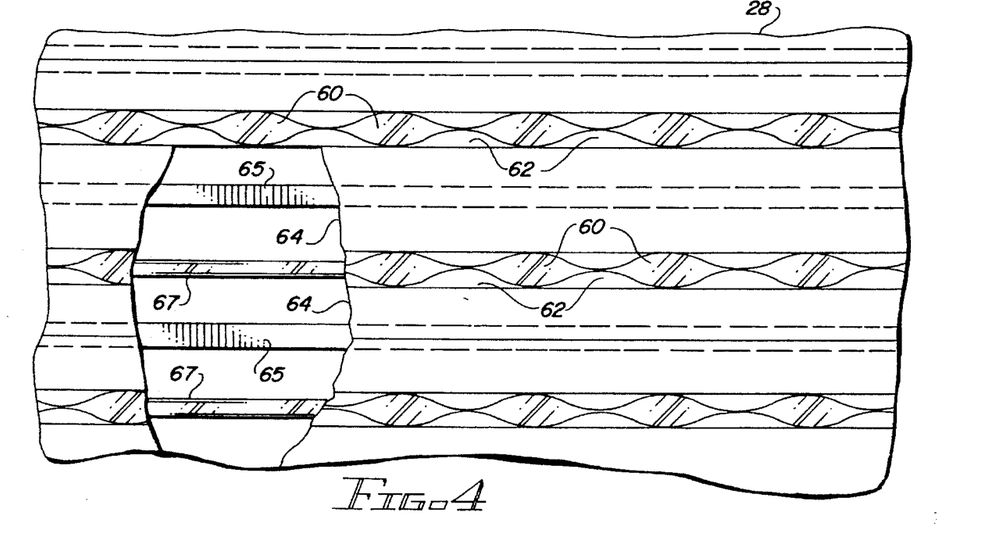
FIG. 4 is a detail of a portion of the structure used in the embodiment shown in FIGS. 1, 2 and 3.
Figure 7:
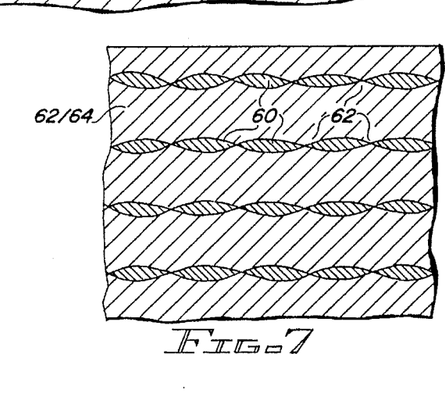
FIGS. 7, 8 and 9 illustrate different grating structures which may be used with the embodiment shown in FIGS. 1 through 3.

FIGS. 4 and 7 illustrate the construction of the structured illumination unit 26 used in a commercial system employing the principles of the invention. Essentially, the unit 26 comprises a lightbox producing a uniform illuminated area. In the illustration of FIG. 4, the light source comprises conventional elongated fluorescent tubes 67 extending longitudinally in alignment with the length of the table 34 in the unit 26, and located above the grating 28. The multiple fluorescent lamps 67 produce a uniform illuminated area by projecting them through a diffusing area composed of milky white plexiglass or other suitable diffusing surfaces. The transparent or translucent portion of the surfaces are illustrated in FIGS. 4 and 7 as the areas 62, which form a sinusoidal grating with dark areas 60 on the translucent plexiglass strips. The strips comprising the sinusoidal pattern 60/62 are placed between opaque areas 64, which may be separate metal strips or painted portions of the plexiglass structure, as desired. The entire grating is supported by means of suitable fasteners (not shown) attached to an underlying framework including longitudinal frame members 65 located between each of the fluorescent tubes 67. As is readily apparent from an examination of FIG. 4, the fluorescent tubes are located directly above the translucent regions 62 of the grating 28, and extend throughout the length of the grating 28; so that uniform light levels are transmitted through the clear or translucent portions 62 from end to end of the grating 28 located above the table 34.

The periodic patterns 60/62 may be painted or silk-screened on the milky white plexiglass used for the grating 28. Since the painting process or screening process is binary in nature (opaque or translucent), the periodic structured pattern is composed of completely opaque and completely diffusing or light-transmitting areas. Variations in opacity may be achieved by using photographic emulsions or by using half tone processes where small binary structures are varied in density to form, over the average, a varied opacity. In most situations, however, binary grating is used; and the simplest form is one in which there are equal regions of dark and bright areas. This is true of the sinusoidal grating which is illustrated in FIGS. 4 and 7.

The sinusoidal grating shown in FIGS. 4 and 7 is used with semi-reflective surfaces, such as flat aluminum stock which is used for lithography and can stock. The scattering in such a semi-reflective surface is the vertical direction, which tends to "fill in" the lines of the sinusoidal pattern; so that the pattern appears equivalent to transverse bars of alternating light transmitting and opaque stripes. The sinusoidal grating is sensitive to slope changes in the longitudinal direction (transverse direction in FIGS. 4 and 7), and the detected intensity of the light along this transverse direction follows a sinusoidal pattern.

Figure 5:
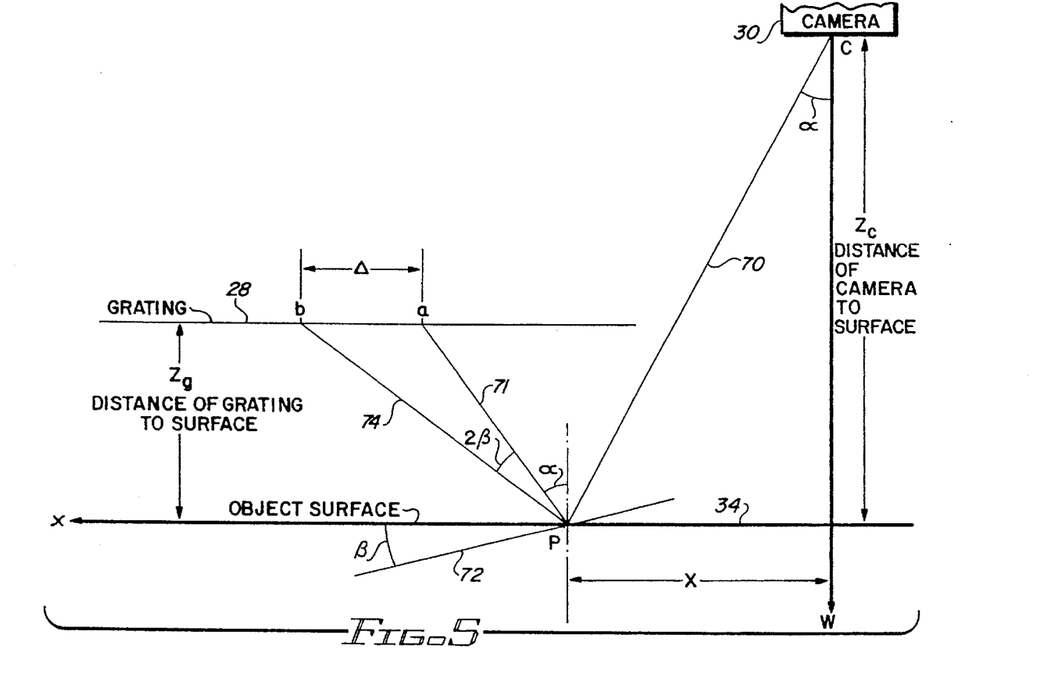
FIG. 5 is a diagram useful in explaining the operation of the system shown in FIGS. 1 through 4.

Reference now should be made to FIG. 5 for an understanding of the manner in which the sheet flatness measurement system or sheet flatness test system operates. As illustrated in FIG. 5, the camera 30 is shown, along with the object surface on the table 34. For the various distances shown in FIG. 5, the object surface can be considered to be the same as the surface of the table 34, since the thickness of a typical sheet is on the order of 0.015". As mentioned above, the sheet flatness measurement principle utilizes a structured illumination, along with phase shifting detection to determine the local surface slope of the sheet undergoing measurement at each image point (pixel). For any image point (or any given direction of view), there is an angle alpha between the line through the center of the camera lens 30 to the point on the object surface on the y axis at the y coordinate of the point being measured and the line through the center of the camera lens 30 to the point P on the surface being measured. For a special case (y=0), the angle Alpha is shown in FIG. 5. If, at that point, the object surface is perfectly flat, the image is reflected at the same angle alpha $\alpha$ and is the point "a" on the grating 28. Stated another way, the grating point "a" is what is observed at the camera 30 for the point P for a flat surface. If the surface has a local slope variation 72, which has a local angle of beta, the image seen by the camera is the point b on the grating 28. This image is displaced by an amount delta ($\Delta$) from the grating image which would otherwise appear for a flat surface. Calculation of the displacement grating image delta (Δ), for the example of FIG. 5 (y=0), is determined according to the following:

$$\Delta = Z_g[\tan(\alpha + 2\beta) - \tan\alpha] \quad (1)$$

Note that the special case, in which the point being measured is on the x axis (y=0), has been illustrated in an effort at simplifying the description and at making the principle clear. For the general case, $Z_g$ in Equation (1) is replaced by $$Z_g\sqrt{1+\left(\frac{y}{Z_c}\right)^2} \text{ and } \tan\alpha \frac{x}{\sqrt{Z_c^2+y^2}},$$

thus Equation (1) becomes $$\Delta = Z_g\sqrt{1+\left(\frac{y}{Z_c}\right)^2} \left[\tan\left(\arctan\left(\frac{x}{\sqrt{Z_c^2+y^2}}\right)+2\beta\right) - \frac{x}{\sqrt{Z_c^2+y^2}}\right].$$

where $Z_g$ is the distance of the grating 28 to the object surface 34, $Z_c$ is the perpendicular distance from the object surface 34 to the camera lens 30, and X and y are the orthogonal components of an arbitrary Cartesian coordinates system in the plane of the object surface 34 with its origin directly beneath the center of the camera 30.

The display on the tv monitor 44 or on the computer color display 46 provides qualitative information of flatness to operators by way of the camera 31, which produces an image of the grating pattern reflected from the sheet. Local slope variations on the surface of the sheet (typically, in the form of "buckles") are shown on the video monitor 44 as spacing and shape variations of the structured illumination pattern. These variations are the result of a distortion of the image of the structured illumination pattern, and comprise local shifts of the periodic illumination pattern from what should be an exact replication of the illumination pattern of the grating 28.

To obtain accurate quantitative information from the distorted image of the structured illumination observed by the camera 30, a method of phase measurement is used. This is the reason the grating 28 (or the entire illumination unit 26, along with the grating 28) is controlled by the motor drive controller 52 and motor drive 54 to move the grating relative to the sheet undergoing measurement on the surface of the table 34. In this method, the periodic structured illumination pattern, which is distorted by irregularities in flatness of the sheet to be measured, is "demodulated", determining the deviations of the periodic structured illumination pattern accurately at each point in the image. This method of retrieving the phase of the periodic function is usually phase shifting, phase measuring, or spatial heterodyning.

Using such information, processed by the microprocessor or computer 36, simultaneous accurate measurements of the surface of the entire sheet on the table 34 may be processed by the computer 36 to produce an image and information for calculating the height variations as a result of the different slope measurements at each of the many points (50,000 or more) located on the surface of the sheet. The sheet flatness measuring system, illustrated in FIGS. 1, 2 and 3, has exhibited repeatabilities of 0.0001" over the entire measurement area. Repeatability readily is determined in the system by subtracting two successive measurements point-by-point in viewing the spread of data via a histogram. The rms deviation also may be computed. Over a sheet surface having a width of 62 inches and a length of 92 inches, the deviation from an absolute flat surface is less than 0.02 inches for surfaces that have buckles of 1 inch. Typical accuracy is better than 4% over the full dynamic range of the system. Local surface deviations on the order of 0.0002 inches can be measured. A minimum I-unit resolution is better than 0.05 I-units. The system can be adjusted for different sensitivity ranges; but a typical range is 0.01 I-units to 200 I-units.

Figure 6:
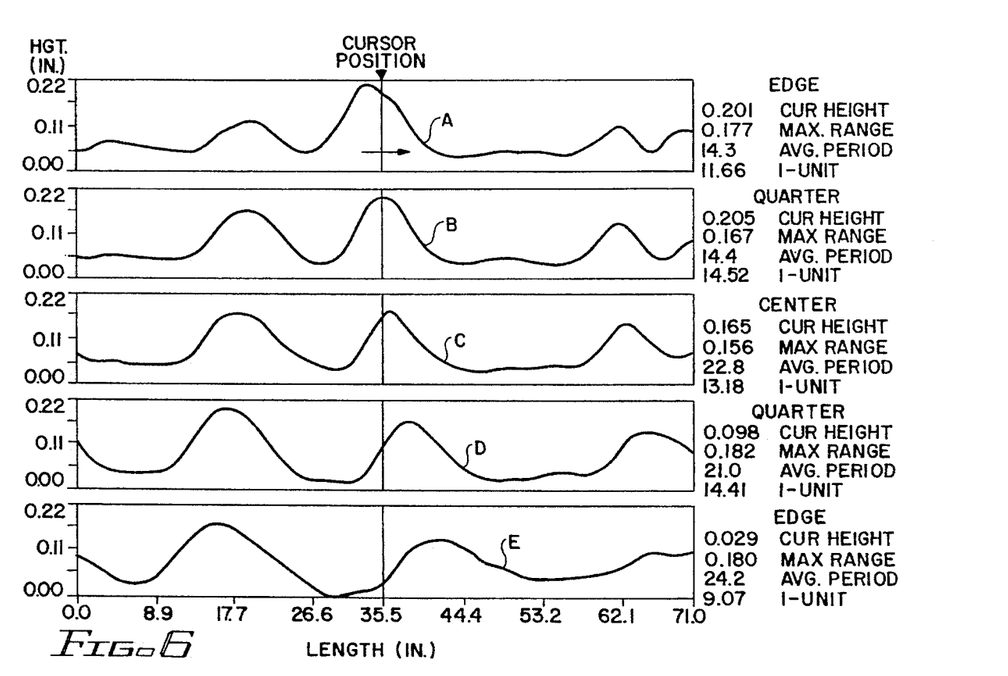
FIG. 6 illustrates a typical five-line profile of a sheet undergoing measurement with the embodiment shown in FIGS. 1 through 4.

FIG. 6 is a typical representative plot or readout of a sheet from end to end at the outside edges, the center, and the quarter points across the width or transverse dimension of the sheet. The curves A, B, C, D and E indicate the height of the sheet along its length (71" length) as a function of a cursor position or trace at different scans across the width of the sheet at the different lengths indicated.

The manner in which the phase measurement used to produce the output shown in FIG. 6 is effected by taking a first reading in the computer and digitizing the information at an image with the grating at the home position represented by x=0 (zero travel distance along the x axis). The grating then is moved to the next position, and the position encoder 40 is tested to measure the distance traveled. When the measured distance the grating 28 travels reaches the position X=λ/4, where λ=one grating period of the structured pattern, the second image is digitized. The digitized information is stored in the computer 36, along with the reading for the first image.

While the grating is still moving, the position encoder 40 again is tested for the distance traveled; and when the grating is at position X=λ/2, the third image is digitized by the video digitizer 38 in the computer. The grating is still moving, and the position encoder 40 is continually providing information to the position encoder 42 in the computer 36. When the grating reaches position X=3λ/4, the fourth image is digitized.

The four digitized images of the pattern, which are observed from the CCD camera 30, are stored by the function processor 39 in the computer 36. The computer 36 has complete access through the digitizer 38 to any image and any point (pixel) within the image. After digitizing the four images, each corresponding to the phase angles of 0°, 90°, 180°, and 270° of offset, the grating 28 is stopped and returned back to its home or starting position (x=0). In an actual working embodiment, the sinusoidal grating pattern was selected to have a period (λ) of 1 foot in length. This is typical for measuring sheets of the dimensions described above.

Assuming an intensity distribution which varies as a function of x, y position, that is at each location in an image the light level changes, the detected intensity can be written as:

$$I(x,y) = A + B \cos(2\pi F(x,y) + \Phi)$$

where A is the average light level, B is the contrast of the sinusoidal detected light distribution, F (x,y) is the functional relationship which is dependent upon the surface variations and corresponds to phi (Φ) defined above, and is the phase offset of the sinusoidal pattern with respect to some arbitrary origin. I(x, y) is the detected intensity at each x, y location (pixels of the video camera).

If the periodic illumination pattern is translated such that the intensity changes at each pixel location, and for an appropriate structured illumination distribution, there exists four intensity distributions, each occurring when the phase offset (or phase shift) of the grating 28 is in multiples π/2.

For Φ=0°, 90°, 180°, and 270° of offset, the four intensities are:

$$I_1 = A + B \cos(2\pi F(x,y))$$

$$I_2 = A - B \sin(2\pi F(x,y))$$

$$I_3 = A - B \cos(2\pi F(x,y))$$

$$I_4 = A + B \sin(2\pi F(x,y))$$

The simple relationship then can solve for the surface function, namely:

$$2\pi F(x,y) = \arctan \frac{I_4 - I_2}{I_1 - I_3}$$

As mentioned above, local slope beta (B) at each pixel location (x, y) is found by solving the following equation for beta (B):

$$\Delta(x,y) = Z_g \sqrt{1 + \left(\frac{y}{Z_c}\right)^2} \left[\tan\left(\arctan\left(\frac{x}{\sqrt{Z_c^2 + y^2}}\right) + 2\beta\right) - \frac{x}{\sqrt{Z_c^2 + y^2}}\right]$$

All of this is done by the computer 36. If these four phase shifted light distribution images are digitized, then, at each pixel, the above equation can be solved to determine the surface function at that image point, independent of all of the other points. That is, the same pixel location in each of the four images is used to compute the surface function which has a relationship to the surface slope at that point for the sheet flatness measurement system.

Figure 10A:
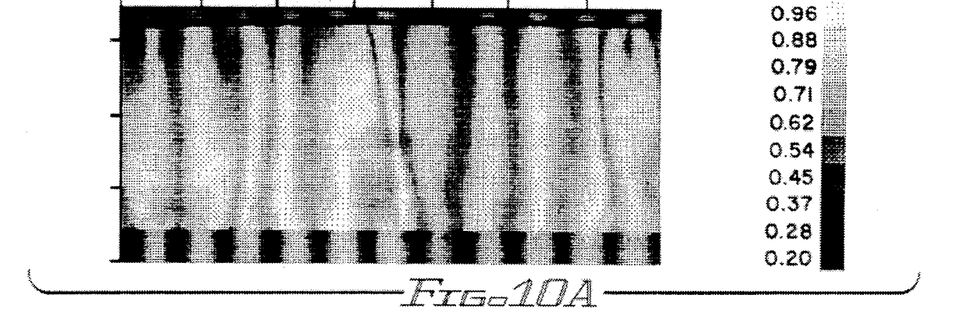
FIGS. 10A through 10D comprise four intensity representations of the information stored by the system of FIG. 1 for four different phase shifted positions.

Reference now should be made to FIGS. 10A through 10D, which constitute four direct plots of intensity pictures of the digital information which is stored for each of the four different phase positions mentioned above, of a sheet undergoing measurement. The actual light intensity representations at each of the different pixels under consideration are shown. The vertical projections at the top of each of FIGS. 10A through 10D constitute reference lines permitting comparisons of the information at each of the different four phase shift positions of the grating 28 producing the four corresponding images of FIGS. 10A through 10D. The chart on the right-hand side of each of FIGS. 10A through 10D constitutes a scale of light intensity, which is useful in providing a direct visual interpretation of the information at any given point (x, y) selected in each of the figures to determine the relative light intensity variations which take place through the different phase shiftings. In each of the figures, there is a relatively uniform border along the image, at both the top and bottom. This uniform border is a result of the exposed surface of the table 34 on either edge of the sheet, since the sheet undergoing measurement is somewhat narrower than the table. The center section, which has the varying image on it between these two borders, is the intensity representation of the sheet undergoing measurement or test. FIG. 10A constitutes the zero phase shift for the first image, which is supplied to and stored in the computer 36 after digitization by the video digitizer 38.

Figure 10B:
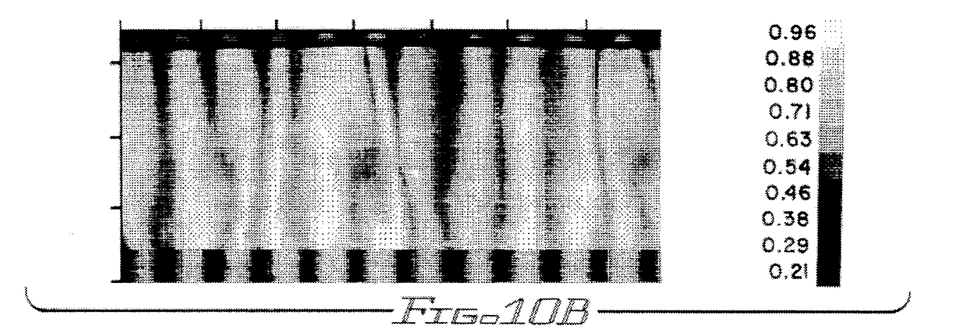
Figure 10C:
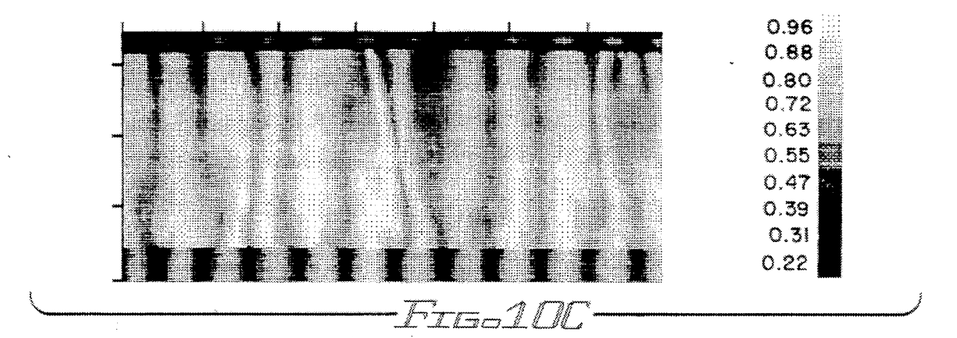
Figure 10D:
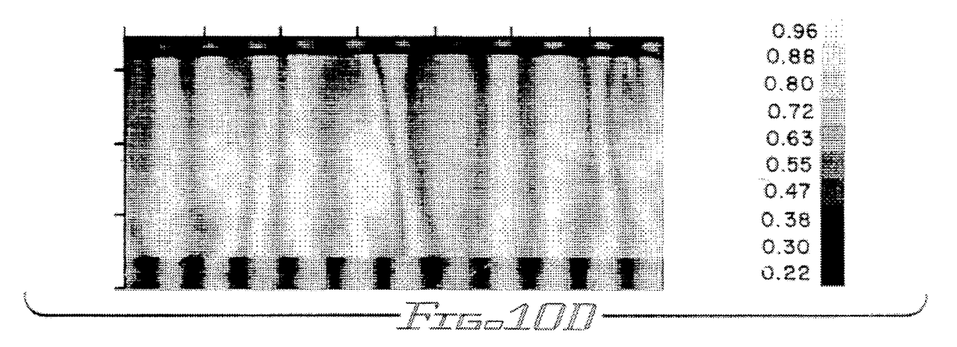

FIG. 10B illustrates the image for a phase shift of the grating 28 of λ/4 or 90° shift. FIG. 10C is an intensity picture of the sheet with a relative shift between the grating 28 and the sheet on the table 34 of λ/2 or 180°; and FIG. 10D is the fourth image representing the 3λ/4 or 270° phase shift of the grating 28 to produce the image of FIG. 10D.

Because of the uniform sinusoidal pattern of the grating (FIGS. 4 or 7) used to produce the images depicted in FIGS. 10A through 10D, if the sheet were perfectly flat, substantially uniform displacement (in the amounts described above for each of the four different images of 10A through 10D) of equal light and dark stripes would appear across the width of the sheet. This readily can be ascertained by reference to either the upper or lower "border" areas on FIGS. 10A through 10D, which are the reflected representations from the optically flat surface of the table 34. A comparison of the relative positions of the dark and light stripes in the border regions clearly indicates the phase movement of the grating 28 to produce a uniform movement of the equal dark and light stripes exposed on the surface of the table 34.

In contrast, the central portions of FIGS. 10A, 10B, 10C and 10D, for the most part, do not produce straight equal width transverse light and dark areas across the sheet, although some areas of the sheet, as readily can be ascertained from an examination and comparison of FIGS. 10A through 10D, are nearly flat. The central portion of the sheet has the most significant departure from flatness, which results in the sloped and somewhat smeared appearance of the light and dark "stripes" across the sheet. This light intensity information is a result of the deviations from flatness on the sheet to produce the surface function of the image at each point, independent of all of the other points, in accordance with the equation given above for solution of the surface function. By solving for the local slope at each pixel location, the computer 36 utilizes the composite mathematical solution to produce a digital representation of the height variations and, therefore, the actual contour of the surface of the sheet along any longitudinal line extending across the sheet from end to end.

By utilizing the intensity data produced by the digitized quadrature phase images of FIGS. 10A through 10D, the computer 36 also may be used to produce a representation of the surface contour of the sheet in the form of a shadow map or in the form of a three-dimensional representation.

Figure 11A:
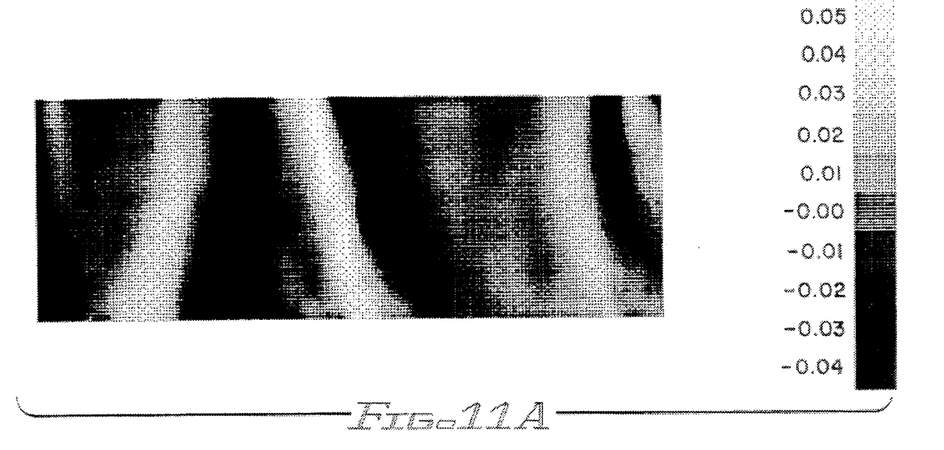
FIG. 11A comprises a shadow map of a typical surface produced by processing the phase shifted information obtained with the embodiment shown in FIGS. 1 through 3.

FIG. 11A is a shadow map proportional to the local slope at each pixel location in an image, as produced by computer data for a different sheet from the one used to produce the intensity images of FIGS. 10A through 10D. In FIG. 11A, the information has been processed to simulate a light source illuminating the sheet surface from the left. Consequently, slopes that face the light source (which is a computer-generated theoretical source) are bright, showing the surface relief; and surfaces which face away from the light source are darker. The chart on the right-hand side of FIG. 11A for the shadow map, comprises a comparative representation of the pitch of the various slopes which are represented. For the sheet depicted in FIG. 11A, the maximum slope is 0.05 IN/IN. In contrast to the intensity pictures of FIGS. 10A through 10D, FIG. 11A shows only the actual sheet undergoing measurement, and does not show any part of the surface of the table 34.

Figure 11B:
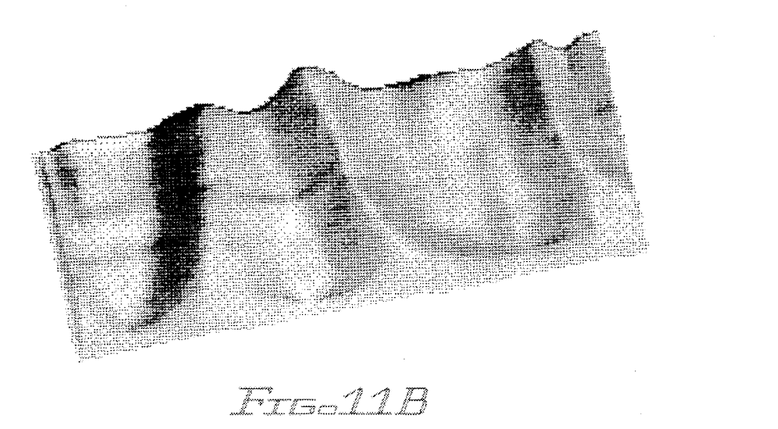
FIG. 11B is a computer-generated solid surface corresponding to the shadow map of FIG. 11A.

FIG. 11B is a representation of the same slope information of FIG. 11A, but processed by the computer in the form of a perspective three-dimensional view. In FIG. 11B, however, the sheet has been reproduced with a simulated or theoretical light source illuminating the sheet from the right (in contrast to FIG. 11A where it illuminated from the left); so that the surfaces which are light in FIG. 11B are those which are dark in FIG. 11A, and vice-versa.

Figure 11C:
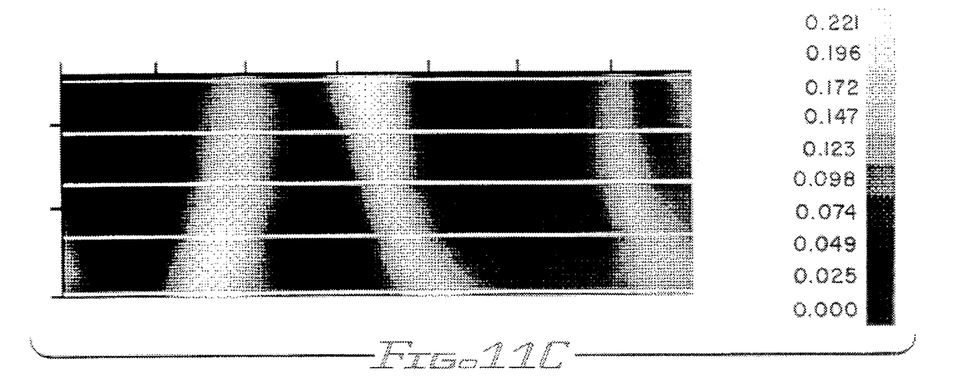
FIG. 11C is computer generation of surface heights displayed as an image with the line profiles of FIG. 6 indicated on it.

Finally, FIG. 11C is another representation of the sheet of FIG. 11A, but one in which five white lines A, B, C, D and E are indicated across the surface at both edges, and the one-fourth, one-half and three-fourths sections longitudinally across the sheet. These five horizontal lines are used to provide the profile information which is depicted in FIG. 6 for the same identical sheet, showing the profile or height variations of the sheet at these different lines running the length of the sheet. In FIG. 11C the bright or lighter regions are higher (closer to the grating 28) than the darker regions, which are lower (closer to the surface of the table 34 and farther from the grating 28). On the right-hand edge of FIG. 11C, the +relative intensities of the different regions are shown for comparison with the sheet representation to permit an evaluation of the different relative heights which are depicted by the digitized information reproduced in FIG. 11C.

The sheet shown in FIGS. 10A through 10D is 34.6" wide and 71.9" long. The sheet shown in FIGS. 11A through 11C is 25.7" wide and 71.0" long.

It should be noted, in conjunction with the foregoing description, that the sinusoidal grating 28 preferably is moved relative both to the light sources in the lighting unit 26 and the table 34. When this is done, any variations of light intensity at any given longitudinal point of the light source do not cause distortions of the digitized slope information. It is possible, however, to move the light source unit 26 and grating 28 as a unit to the different measuring positions for the four different phases used to compute the height information. If this is done, however, some distortion may occur as a result of differences in light intensity of the light source, which could affect, although to a relatively small degree, the calculations of slope which ultimately are used to determine the variations in height of the contour of the top of the sheet.

Figure 8:
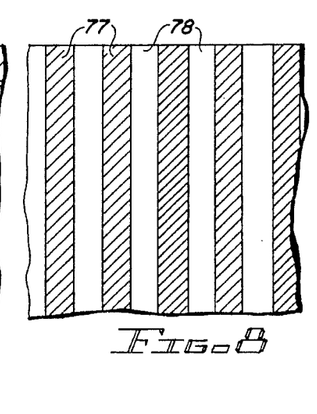
Figure 9:
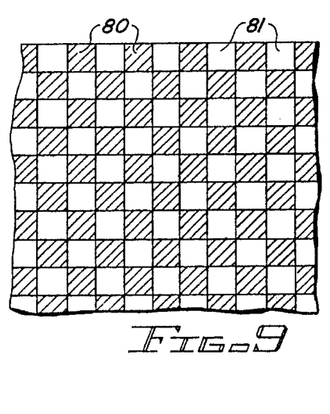

FIGS. 8 and 9 illustrate alternative grating patterns, which may be used in place of the sinusoidal grating which has been described above. In FIG. 8, a binary or squarewave grating can be used with both reflective and semi-reflective surfaces. The grating has alternating dark and clear portions 77 and 78 across it. The grating is illustrated as extending transversely across the sheet; so that the direction of motion of the grating, relative to the table 34, would be in the "x" direction, as viewed in FIG. 8. The detected intensity in the horizontal or x direction, with the system otherwise identical to the one described above in conjunction with FIGS. 1, 2 and 3, produces approximately a squarewave output. Filtering (optical and electronic) may be used to generate a sinusoidal signal for phase measurement processing. The grating then can also be rotated 90° to be sensitive to slopes in the y direction of the sheet. In FIG. 8, the fluorescent light sources are mounted parallel to the grating above each of the clear areas.

FIG. 9 illustrates a checkerboard grating, which may be used, employing dark portions 80 and light portions 81 in an alternating pattern. The checkerboard grating is sensitive to slopes in both the x and y directions, with a single grating. Phase shifting then can be used in both the x and y directions, with suitable optical and electronic filtering, to generate sinusoidal signals for phase measurement processing. In all other respects, the system operates as described above for the grating of FIG. 7, whether the gratings of FIG. 8 or FIG. 9 are used.

The gratings of FIGS. 8 and FIG. 9 may be used with either fully reflective or semi-reflective surfaces. It should be noted that the grating travel direction will vary with the specific grating design utilized.

To produce accurate measurements or representations of the surface variations of the large flat sheets described, the periodicity of the grating is made relatively large (on the order of 1 foot or so). In addition, the grating 28 is placed several feet above the top surface of the table 34, that is on the order of 6 feet to 8 feet or more above the top of the table. This permits the maximum utilization of the system to simultaneously view and compute the surface aberrations over the entire sheet, in contrast to a system which must scan or sweep over the sheet in either a mechanical or an optical manner.

The foregoing description of the preferred embodiment of the invention should be considered as illustrative, and not as limiting. Various changes and modifications will occur to those skilled in the art, without departing from the true scope of the invention. For example, a variety of different mechanical systems may be used for moving and positioning the grating over the table 34. Various techniques also may be used for digitizing and processing the data to produce the information depicted in FIGS. 6, 10 and 11. Various other changes and modifications will occur to those skilled in the art without departing from the true scope of the invention as defined in the appended claims.

We claim:

1. A method for measuring the flatness of relatively large flat reflective and semi-reflective surfaces including the steps of:

providing a flat structured illumination in the form of a periodic pattern of opaque and illuminated regions;

orienting said structured illumination in a plane parallel to the plane of a flat surface undergoing measurement to simultaneously illuminate the entire surface undergoing measurement;

moving said structured illumination relative to the surface undergoing measurement to cause the light level on the surface undergoing measurement to vary in accordance with the periodicity of the structured illumination;

detecting the light level reflected from multiple locations on the surface undergoing measurement; and determining the change in the slope of the detected structured illumination pattern corresponding to variations in the local slope of the surface undergoing measurement.

2. The method according to claim 1 further including the step of analyzing the change in the local slope of the detected structured illumination pattern by utilizing phase measuring analysis.

3. The method according to claim 2 wherein the structured illumination system is oriented parallel to the surface undergoing measurement in two orthogonal directions.

4. The method according to claim 3 wherein the step of moving the structured illumination system relative to the surface undergoing measurement comprises moving said structured illumination system in an amount equal to at least one-half period of the periodic pattern of said structured illumination.

5. The method according to claim 4 wherein the step of detecting the light level is effected by means of a video camera.

6. The method according to claim 5 wherein the step of analyzing comprises comparing successive detected light levels at each pixel location for different predetermined positions of the structured illumination system as it is moved.

7. The method according to claim 2 wherein the step of analyzing comprises comparing successive detected light levels at each pixel location for different predetermined positions of the structured illumination system as it is moved.

8. The method according to claim 1 wherein the structured illumination system is oriented parallel to the surface undergoing measurement in two orthogonal directions.

9. The method according to claim 1 wherein the step of detecting the light level is effected by means of a video camera.

10. The method according to claim 1 wherein the step of moving the structured illumination system comprises moving said structured illumination system in an amount equal to at least one-half period of the periodic pattern of said structured illumination.

11. A system for measuring the flatness of large reflective and semi-reflective surfaces including in combination:

a base member having a support surface in a first plane on which a sheet, the flatness of the surface of which is to be measured, is placed;

a frame;

a structured illumination system mounted on said frame over said base member to simultaneously illuminate the entire surface to be measured, said structured illumination system located in a second plane parallel to said first plane and producing a periodic pattern of opaque and illuminated lines forming a periodic variation in light level along at least one direction parallel to the support surface of said base member;

means for moving the structured illumination system in said second plane relative to the base member along the direction of illumination;

means for detecting the light level at multiple locations reflected from the surface of a sheet on the support surface of said base member; and computing means coupled with said detecting means for determining the local slope of the surface of a sheet on said base member from the reflected structured illumination pattern produced by slope variations in the surface of such a sheet.

12. The combination according to claim 11 wherein said detecting means comprises a camera means.

13. The combination according to claim 12 wherein said camera means is a video camera having a lens capable of imaging the entire surface of a sheet on said base member.

14. The combination according to claim 13 wherein said computing means is coupled with said video camera for computing the local slope at each pixel location of a sheet on said base member from changes in the illumination caused by different relative locations of said structured illumination system and said base member.

15. The combination according to claim 14 wherein means for moving said structured illumination system relative to said base member is selected to be sufficient to produce a minimum change in the detected light level corresponding to a change of at least one-half period of the structured illumination.

16. The combination according to claim 15 wherein said computing means comprises computation means for determining the local slope beta (B) at each pixel location (x,y) on the surface of a sheet on said base member by solving the following equation for beta (B):

$$\Delta(x,y) = Z_g \sqrt{1 + \left(\frac{y}{Z_c}\right)^2} \cdot \left[\tan\left(\arctan\left(\frac{x}{\sqrt{Z_c^2 + y^2}}\right) + 2\beta\right) - \frac{x}{\sqrt{Z_c^2 + y^2}}\right]$$

where $Z_g$ is the distance of the surface of the member undergoing measurement to said structured illumination system, $Z_c$ is the distance of the camera means to the surface of the member undergoing measurement, X is the distance from a center line through the camera means to the pixel undergoing measurement in a straight line along the direction of movement of the structured illumination system, $\Delta(x,y)$ is the distance of periodicity of the periodic pattern of the structured illumination system.

17. The combination according to claim 16 wherein said periodic pattern is selected from one of a group of patterns consisting of equally-spaced opaque and transmissive straight lines, sinusoidal opaque and transmissive regions, and equally spaced opaque and transmissive straight lines repeated in orthogonal directions.

18. The combination according to claim 11 wherein means for moving said structured illumination system relative to said base member is selected to be sufficient to produce a minimum change in the detected light level equal to at least one-half period of the structured illumination.

19. The combination according to claim 18 wherein said periodic pattern is selected from one of a group of patterns comprising equally-spaced opaque and transmissive straight lines, sinusoidal opaque and transmissive regions, and equally spaced opaque and transmissive straight lines repeated in orthagonal directions.

* * * * *